(12) United States Patent  (10) Patent No.: US 8,090,014 B2
Cheung et al.  (45) Date of Patent: Jan. 3, 2012

(54) MANAGING MULTIVIEW STREAMING VIDEO DATA COMPOSED OF FRAMES

(75) Inventors: Gene Cheung, Tokyo (JP); Antonio Ortega, Los Angeles, CA (US); Takashi Sakamoto, Tokyo (JP)

(73) Assignee: Hewlett-Packard Development Company, L.P., Houston, TX (US)

( * ) Notice: Subject to any disclaimer, the term of this patent is extended or adjusted under 35 U.S.C. 154(b) by 758 days.

(21) Appl. No.: 12/246,274

(22) Filed: Oct. 6, 2008

(65) Prior Publication Data
US 2010/0086023 A1  Apr. 8, 2010

(51) Int. Cl.
  *H04N 7/12* (2006.01)
  *H04N 11/02* (2006.01)
  *G06K 9/36* (2006.01)
(52) U.S. Cl. ......... 375/240.02; 375/240.13; 375/240.14; 375/240.15; 375/240.16; 382/236; 382/237; 382/238
(58) Field of Classification Search .............. 375/240.02
See application file for complete search history.

(56) References Cited

OTHER PUBLICATIONS

IEEE—"Efficient Prediction Structure for MultiView Video Coding" Nov. 2007—Philipp Merkle.*
Merkle, P. et al., "Efficient Prediction Structures for Multiview Coding", IEEE Transactions on Circuits and Systems for Video Technology, Nov. 2007.
Flierl, M. et al., "Motion and Disparity Compensated Coding for Multiview Video", IEEE Transactions on Circuits and Systems for Video Technology, Nov. 2007.
"Second Life: Official site of the 3D online virtual world", http://secondlife.com, downloaded Oct. 6, 2008.
"Warsow—A Fast Paced First Person Shooter Game", http://www.warsow.net, downloaded Oct. 6, 2008.
"Half-Life TV", http://www.hltv.org, downloaded Oct. 6, 2008.
"Serious Games Initiative", http://www.seriousgames.org, downloaded Oct. 6, 2008.
Cheung, G. et al., "Graphics-to-video encoding for 3G mobile game viewer multicast using depth values", IEEE International Conf. on Image Processing, Oct. 2004, Abstract.
Cheung, G. et al., "ECHO: A Community Video Streaming System with Interactive Visual Overlays", Jan. 2008.
Cheung, G. et al., "Fast H.264 Mode Selection Using Depth Information for Distributed Game Viewing", Jan. 2008.
Schulzrine, H. et al., "Real Time Streaming Protocol (RTSP)", Apr. 1998.
Cheung, N. et al., "Distributed Source Coding Application to Low-Delay Free Viewpoint Switching in Multiview Video Compression", Nov. 2007.
Karczewicz, M. et al., "The SP- and SI-frames design for H.264/AVC", IEEE Transactions on Circuits and Systems for Video Technology, Jul. 2003.
"The TML Project Web-Page and Archive", http://kbc.cs.tu-berlin.de/stewe/vceg/, downloaded Oct. 6, 2008.
"Test Squares at MERL", ftp://ftp.merl.com/pub/avetro/mvc-testseq, downloaded Oct. 6, 2008.

* cited by examiner

*Primary Examiner* — Longbit Chai

(57) ABSTRACT

A system for managing multiview streaming video data composed of a plurality of frames includes an encoder configured to encode multiple representations of at least one frame of the plurality of frames corresponding to multiple views using different reference frames for each of the multiple representations. The system also includes a controller configured to create a coding tree containing the plurality of frames and the multiple representations. The system further includes a data store configured to store the coding tree, wherein the controller is further configured to identify a storage constraint of the data store and to omit at least one of the multiple representations from the coding tree to cause the plurality of frames stored in the data store to remain within the storage constraint.

12 Claims, 8 Drawing Sheets

MANAGING MULTIVIEW STREAMING VIDEO DATA COMPOSED OF FRAMES

BACKGROUND

Video is typically compressed using Intra coded frames (I-frames) and Inter or Predicted frames (P-frames). I-frames are frames that are coded without prediction from other frames and thus do not require reference frames. P-frames are those frames that use prediction from a reference frame. I-frames also contain only intra macroblocks, whereas, P-frames contain either intra macroblocks or predicted macroblocks. P-frames require prior decoding of some other reference frame in order to be decoded and often require fewer bits for encoding than I-frames.

There has been increased development of video applications where multiple views (multiviews) of a scene are captured simultaneously, encoded using I-frames and/or P-frames, and delivered to users. In these types of video applications, users are given the ability to switch among the multiple views in real-time and are thus afforded greater levels of interactivity than with conventional video applications. Among applications for multiview video coding (MVC) tools are those where users are allowed to select for playback only a subset of those views or, potentially, virtual views generated from the actual captured video data.

A schematic diagram of a conventional coding tree 100 based on I-frames (I(i,j)), wherein i is the time index and j is the view, encoded at a server and communicated to a client is depicted in FIG. 1. As shown therein, the coding tree 100 is encoded based solely on I-frames and thus, some of the I-frames may generate different views as compared with other I-frames, without requiring reference frames for differential coding. However, the coding tree 100 depicted in FIG. 1 requires large transmission costs because I-frames are typically several times larger than P-frames, as discussed above.

Many of the recent activities in MVC have focused on image capture and compression. For example, the MVC standardization process has concentrated on developing new compression algorithms to encode all of the frames in the multiview sequence in a rate-distortion optimal manner. As such, much consideration has not been given to affording more efficient multiview control of streaming video to clients.

BRIEF DESCRIPTION OF THE DRAWINGS

Features of the present invention will become apparent to those skilled in the art from the following description with reference to the figures, in which.

DETAILED DESCRIPTION

For simplicity and illustrative purposes, the present invention is described by referring mainly to an exemplary embodiment thereof. In the following description, numerous specific details are set forth in order to provide a thorough understanding of the present invention. It will be apparent however, to one of ordinary skill in the art, that the present invention may be practiced without limitation to these specific details. In other instances, well known methods and structures have not been described in detail so as not to unnecessarily obscure the present invention.

Disclosed herein are a system and method of managing video data composed of a plurality of frames. The system and method disclosed herein are configured to create a coding structure that enables an optimal trade-off between storage cost and transmission cost of encoded frames. In one regard, the trade-off may be made by selectively encoding certain frames more than once such that the coding structure includes multiple representations of those selected frames created using different reference frames. By selectively encoding selected ones of the frames instead of all of the frames, the coding structure of the present invention requires substantially less space as compared with a coding tree in which all of the multiple representations of the frames have been encoded.

The coding structure may be employed to enable multiview video streaming data to be communicated to a client to enable a user of the client to interactively receive frames from a server. By way of example, the coding tree may be employed to identify the route through the frames that provides the most efficient communication of frames to enable the client to reconstruct a desired frame.

Figure 2:
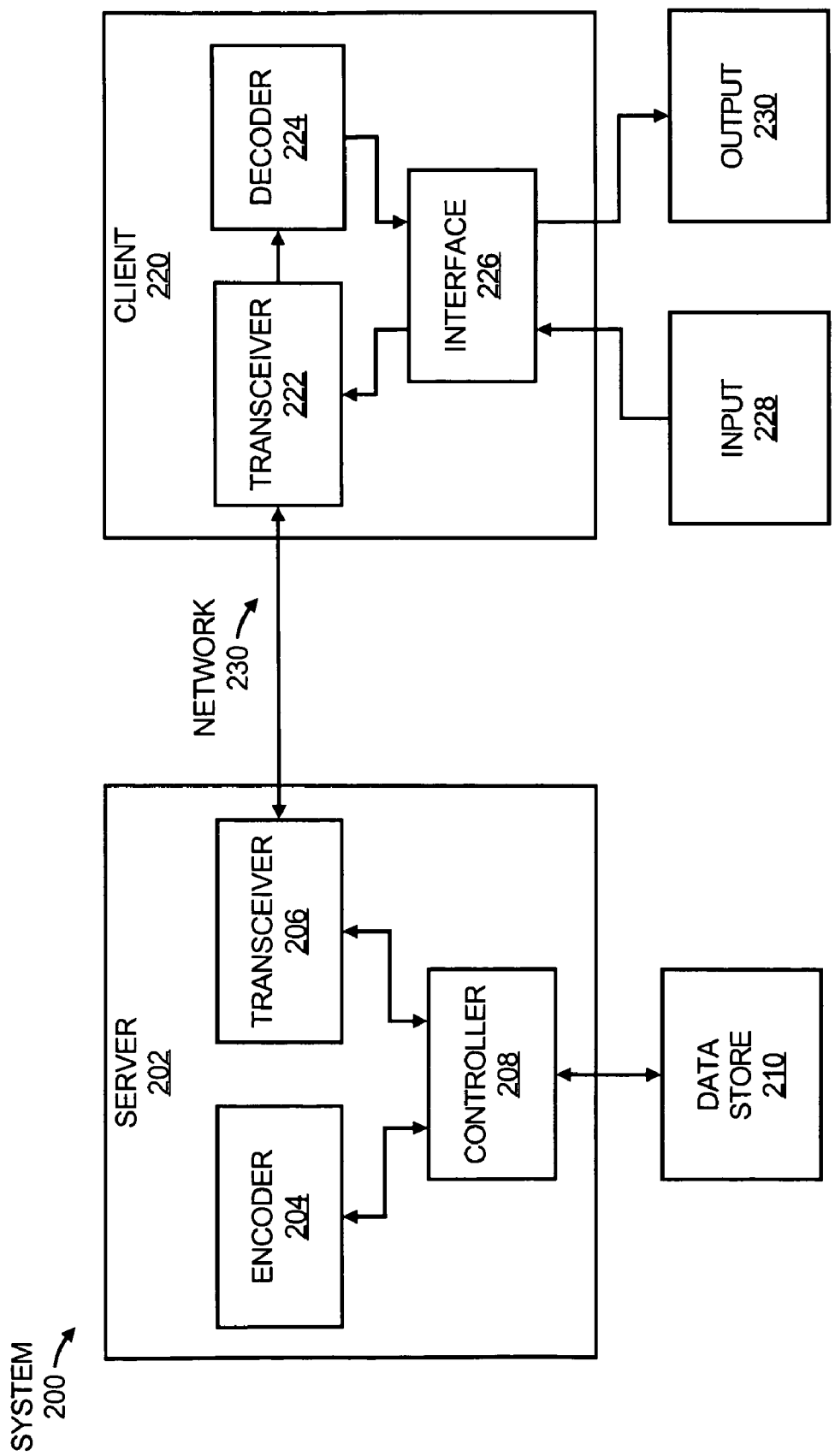
FIG. 2 shows a simplified block diagram of a system for enabling multiview stream data content to be consumed at a client from a server, according to an embodiment of the invention.

With reference to FIG. 2, there is shown a simplified block diagram of a system 200 for enabling multiview streaming data content to be consumed at a client 220 from a server 202, according to an example. In one regard, the methods disclosed herein below may be implemented in the system 200 as discussed in greater detail herein below. It should be understood that the system 200 may include additional components and that some of the components described herein may be removed and/or modified without departing from a scope of the system 200.

As shown in FIG. 2, the system 200 includes a server 202 in communication with a client 220 over a network 230. Although a single server 202, a single client 220, and a single network 230 have been depicted in FIG. 2, the system 200 may include any number of servers 202, clients 220, and networks 230. The network 230 may comprise a local area network, such as an Intranet, or a wide area network, such as the Internet.

In any regard, the server 202 generally comprises a content provider, such as, a web-based content provider configured to supply encoded content to the client 220. The encoded content comprises encoded frames of a streaming video. According to an example, the server 202 enables selection and viewing of multiple views of a common scene in the streaming video. A user may thus implement the client 220 to interactively view the same scenario, such as, content captured by cameras positioned at different locations with respect to each other, virtual multiple views derived from computer generated data, etc., as captured or viewed from multiple views. As such, the server 202 may supply the client 220 with frames depicting multiple views of the same scene in a movie, an instructional video, a computer game, etc. Thus, for instance, a user may implement the client 220 to interactively control viewing of a particular scene from multiple views.

The server 202 includes an encoder 204 configured to encode the frame data to substantially minimize transmission costs associated with the interactive streaming of the video, subject to a storage cost constraint of all of the prepared encoded video data at the server 202. Various manners in which encoder 202 operates to encode the video to achieve these goals are described in greater detail herein below. The encoder 204 generally comprises software and/or hardware configured to perform the functions discussed herein below.

The server 204 also includes a transceiver 206, a controller 208, and a data store 210. The transceiver 208 generally comprises software and/or hardware configured to enable communications with one or more clients 220. The transceiver 208 thus enables selected video to be communicated to and instructions to be received from the client(s) 220. The controller 208 generally comprises a processor, ASIC, microcontroller, etc., configured to control the operations of the server components, including, the encoder 204, the transceiver 206, and the data store 210.

The data store 210 comprises any device capable of storage of information or any combination of devices capable of storage of information, such as, a semiconductor device, a magnetic disk memory device, nonvolatile memory devices, such as, an EEPROM or CDROM, etc. The data store 210 may also comprise a fixed or removable data storage device. In addition to storing the encoded video, the data store 210 may also store one or more program instructions, which the controller 208 may execute in performing various operations in the encoder 204 and the transceiver 206, for instance. Although the data store 210 has been depicted as forming a separate component from the server 202, the data store 210 may be integrated with the server 202 without departing from a scope of the system 200 discussed herein.

The client 220 includes a transceiver 222, a decoder 224, and an interface 226. Although not shown, the client 220 may include a number of additional components, such as, a controller, a data store, and other components. By way of example, the client 220 may comprise a computing device networked to the server 202 via the Internet. As another example, the client 220 may comprise a television receiver configured to receive content from the server 202 via a cable or satellite connection.

In any regard, the transceiver 222 comprises software and/or hardware configured to enable communications with one or more servers 202. The transceiver 222 thus enables a user to interactively communicate with the server(s) 202, for instance, to communicate instructions to change a view of content currently being received from the server(s) 202. The decoder 224 comprises software and/or hardware configured to decode the encoded video received from the server(s) 202.

The interface 226 comprises software and/or hardware configured to enable interactions between the client 220 and a user. The interface 226 is configured to receive instructions from a user through an input 228, which may comprise, a user interface, such as, a keyboard, a mouse, a touchpad, a remote control, a microphone, etc. The interface 226 is also configured to enable display of the decoded video on an output 230, such as, a computer monitor, a television monitor, etc.

In operation, a user may implement the client 220 to receive video streaming data prior to initiating an interactive multiview streaming session with the server 202. In this operation, the client 220 may have received a frame ($F_{i,j}$) corresponding to time instant i and view j. Following receipt of that frame ($F_{i,j}$), the client 220 may request, in real-time, receipt of the frame ($F_{i+1,k}$) at time instant i+1 and view k, where the view k may or may not equal view j. In response, the server 202 sends an appropriate set of encoded data, which has been prepared and stored in the data store 210, to the client 220, such that the decoder 224 may decode the frame ($F_{i+1,k}$). The transmission of the appropriate set of encoded data may include transmission of one or more reference frames (P-frames or I-frames) to enable the decoder 224 to appropriately decode the frame ($F_{i+1,k}$).

According to an example, the encoder 204 is configured to encode the frames (F) of a multiview video in a manner that substantially reduces costs associated with transmitting the frames (F) of a multiview video. One manner in which the server 202 operates to achieve this goal is described with respect to FIG. 3. According to another example, the encoder 204 is configured to encode the frames (F) of a multiview video in a manner that substantially optimizes a tradeoff between costs associated with transmitting the encoded frames and costs associated with storing the encoded frames along with the predicted sequences of the frames. One manner in which the server 202 operates to achieve this goal is described with respect to FIG. 4. Another manner in which the server 202 operates to achieve this goal is described with respect to FIG. 5. In all of the following figures, it should be understood that the encoder 204 is required to encode at least one frame for each view in each time index to enable the decoder to appropriately decode all of the frames.

Figure 1:
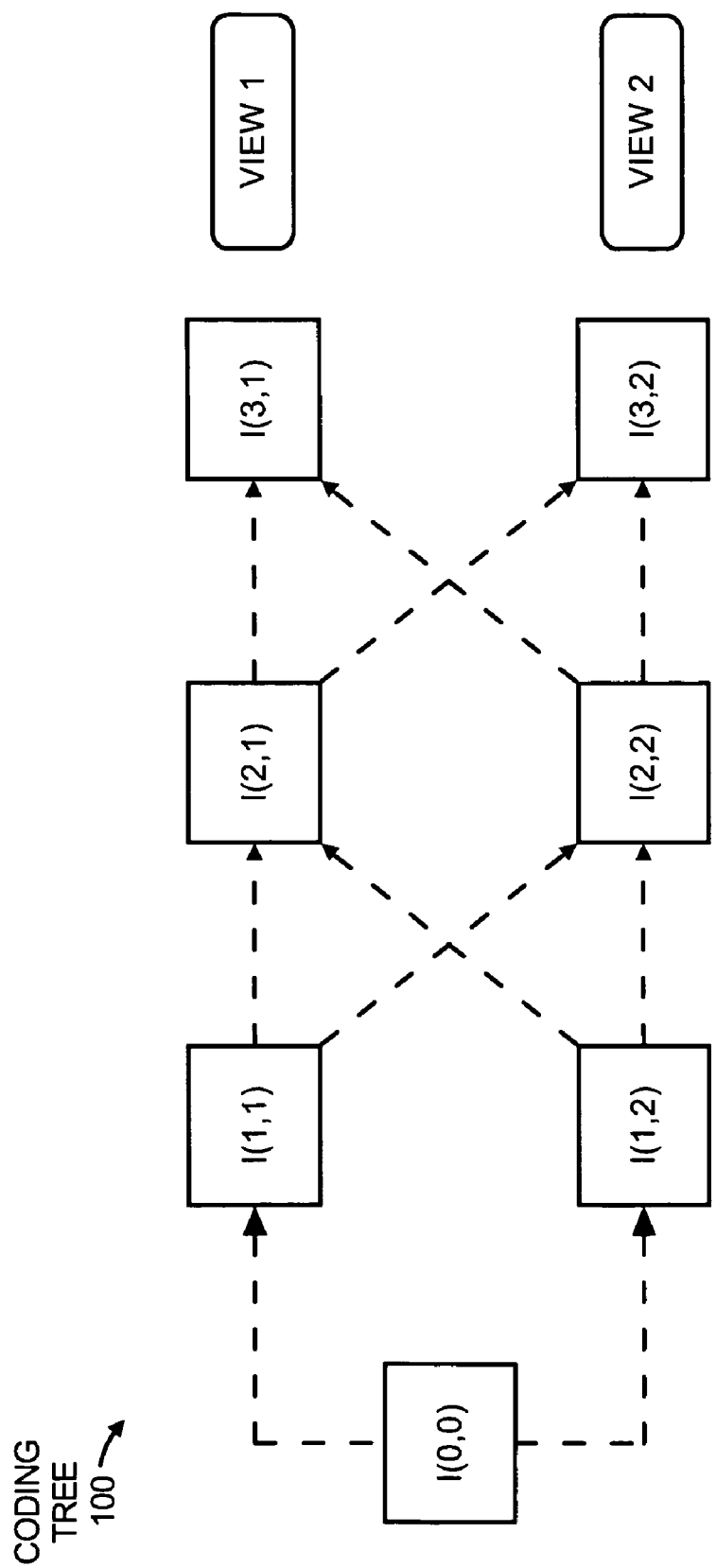
FIG. 1 depicts a schematic diagram of a conventional coding tree based on I-frames.
Figure 3:
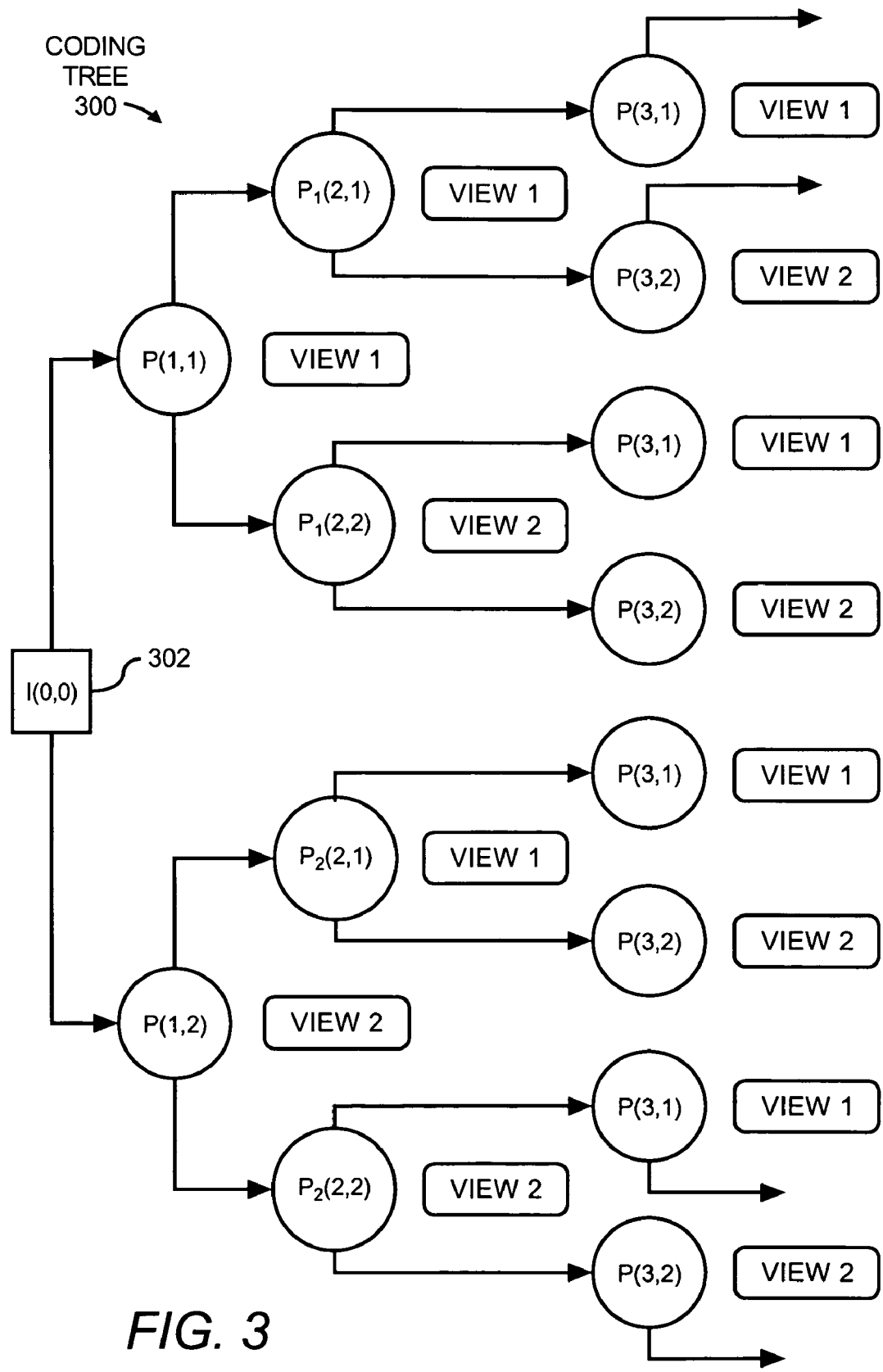
FIG. 3 depicts a coding tree for enabling interactive multiview streaming video data composed of frames have been encoded as multiple representations of the frames based on a root I-frame and a plurality of P-frames, according to an embodiment of the invention.

With reference first to FIG. 3, there is shown a schematic diagram of a coding tree 300, which is includes a base I-frame 302 and a plurality of P-frames. As shown, the P-frames rely upon prior P-frames or the I-frame 302 as reference frames for differential coding. In addition, the coding tree 300 includes multiple representations of some of the frames, in which each of the multiple representations relies upon a different reference frame for differential coding. According to the coding tree 300 depicted in FIG. 3, the client may select from multiple views and may receive the string of appropriate P-frames, which were prepared a priori, according to the selected views. In one regard, the transmission costs associated with communicating the P-frames is relatively less than those associated with transmitting the I-frames discussed above with respect to FIG. 1. One drawback of storing the coding tree 300 depicted in FIG. 3 is that the costs associated with storing the I-frames and the P-frames is increased exponentially as compared with storing the I-frames due to the preparation and storage of predicted frame sequences of all of the possible view traversals. The storage requirement is reduced through use of the coding trees 400 and 500 discussed herein below.

Figure 4:
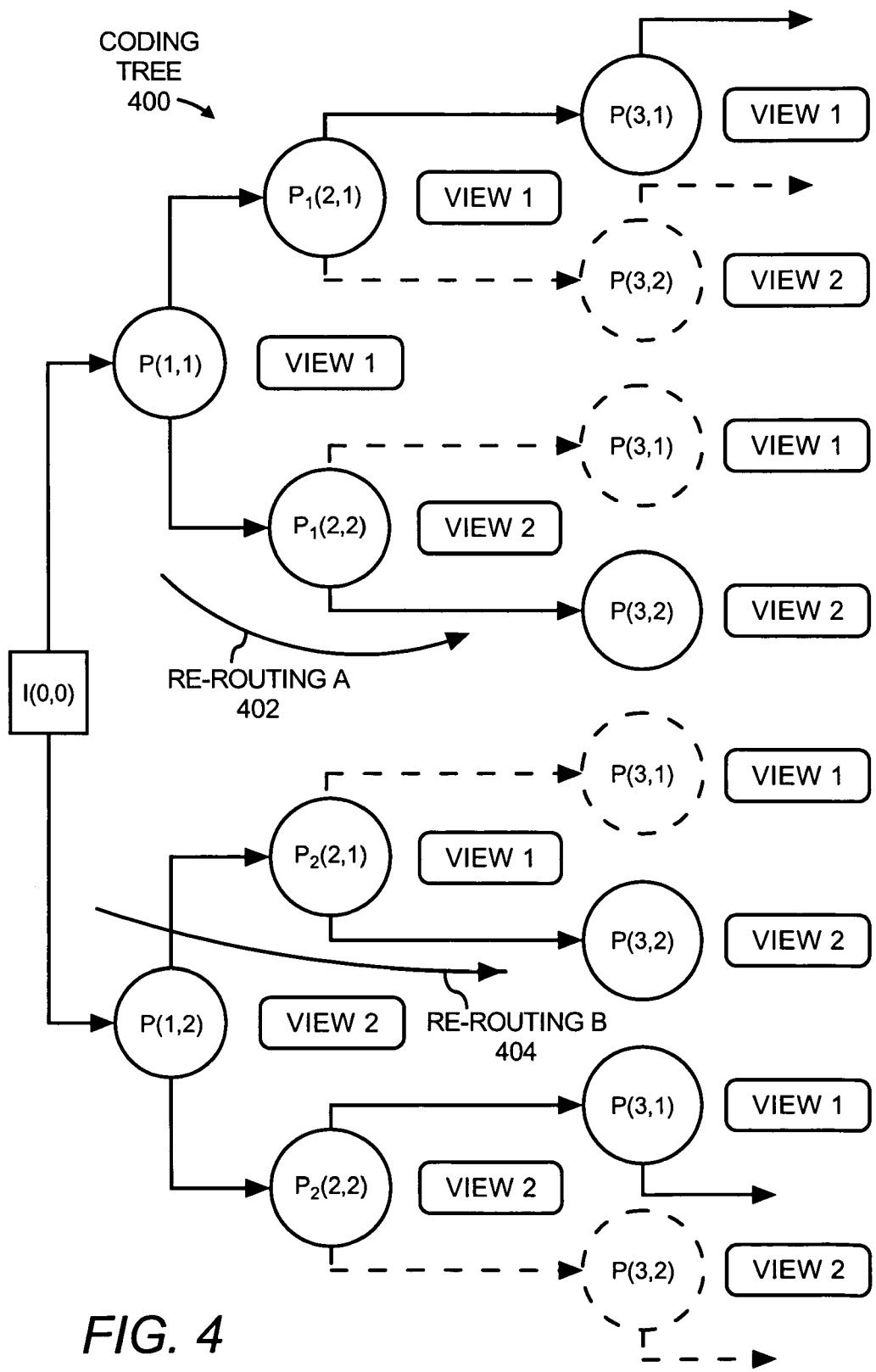
FIGS. 4 and 5, respectively show coding trees in which a number of frames have been omitted or removed to thus reduce the storage space requirements of the encoded frames, according to an embodiment of the invention.

With reference first to FIG. 4, there is shown a coding tree 400 in which a number of frames have been omitted or removed to thus reduce the storage space requirements of the encoded frames, according to an example. It should be understood that the coding tree 400 depicted in FIG. 4 is merely an illustrative example of a possible coding tree and should thus not be construed as limiting the invention in any respect.

The coding tree 400 illustrates an example of a coding tree containing frames arranged according to their respective required sequences to enable appropriate decoding of the frames. The coding tree 400 includes multiple representations of frames that have been encoded using different reference frames. As shown therein, a number of the multiple representations of the frames have been depicted with dashed lines to indicate that the encoder 204 has not encoded those frames and/or that those frames have not been stored in the data store 210. As such, the amount of space required to store the frames and the predicted frame sequences in the data store 210 is substantially reduced as compared with the space required by the coding tree 300 depicted in FIG. 3. In FIG. 3, when a request is received for a particular frame, any of a number of paths may be followed to supply the client with the appropriate frame sequences to enable the client to decode that particular frame. In addition, each of the selected paths depicted in the coding tree 300 in FIG. 3 requires the same transmission costs.

With regard to FIG. 4, however, the transmission costs are path-dependent. That is, some of the paths require a larger transmission cost depending upon which of the frames have already been sent to the client 220. To illustrate this point further, assume that the client 220 is currently viewing frame $P_1(2,1)$ and has received frames P(1,1) and I(0,0). In addition, assume that the client 220 has requested frame P(3,2). As shown, the frame P(3,2) has not been encoded and stored following the path from frame $P_1(2,1)$ and P(1,1). In this situation, the controller 208 seeks alternative routes through the coding tree 400 to enable appropriate decoding of the frame P(3,2).

One of the routes that the controller 208 may select is re-routing A 402 and another route is re-routing B 404. In re-routing A 402, the controller 208 needs to send frames $P_1(2,2)$ and P(3,2) since frames P(1,) and I(0,0) have previously been sent to the client 220. In re-routing B 404, the controller 208 is required to send frames P(1,2), $P_2(2,1)$, and P(3,2) because frame I(0,0) was previously sent to the client 220. It should be noted that the frame $P_2(2,1)$ differs from the frame $P_1(2,1)$ because they were created using different reference frames P(1,1,) and P(2,2), respectively. In addition, the controller 208 is configured to select the re-routing path that requires the substantially minimal transmission cost. In this example, the re-routing path 404 requires more transmission cost that the re-routing path 402 because path 404 requires transmission of an additional frame ($P_2(2,1)$).

As such, the coding tree 400 with at least some of the frames removed or omitted and selection of a path that requires the least transmission cost as disclosed herein is one manner in which a client may be given the ability to interact with a streaming video, for instance, to change views in a multiview streaming video, while remaining within a storage cost constraint of the data store 210.

Figure 5:
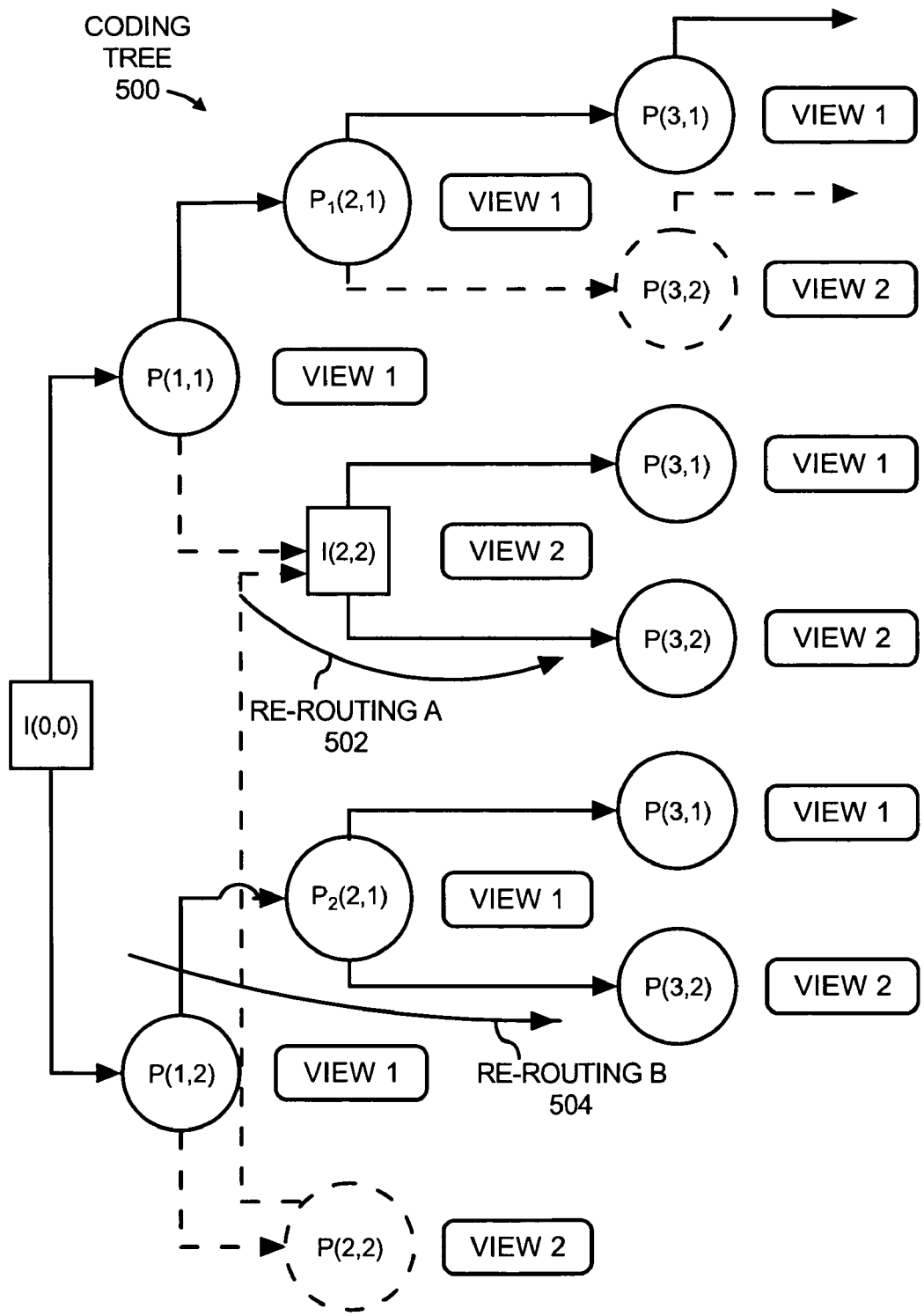

Turning now to FIG. 5, there is shown a coding tree 500 in which a number of frames have been omitted or removed to thus reduce the storage space requirements of the encoded frames and in which a P-frame has been replaced with an I-frame, according to an example. It should be understood that the coding tree 500 depicted in FIG. 5 is merely an illustrative example of a possible coding tree and should thus not be construed as limiting the invention in any respect.

As shown in FIG. 5, multiple representations of frame P(2,2) have been omitted or removed from the coding tree 500 as denoted by the dashed lines and as compared with FIG. 4. In addition, an I-frame I(2,2) has been placed in their previous position in the coding tree 500. Although the I-frame I(2,2) may require greater storage costs and transmission costs than a single P-frame P(2,2), the use of the I-frame I(2,2) may result in reduced storage costs due to the reduction in the number of descendent P-frames from the single P-frames P(2,2) and the single P-frames P(2,2) themselves. In addition, re-routing through the coding tree 500 may also require less transmission costs because the I-frame I(2,2) comprises an independent frame.

To illustrate this point further, assume that the client 220 is currently viewing frame $P_1(2,1)$ and has received frames P(1,1) and I(0,0). In addition, assume that the client 220 has requested frame P(3,2). As shown, the frame P(3,2) has not been encoded and stored following the path from frame $P_1(2,1)$ and P(1,1). In this situation, the controller 208 seeks alternative routes through the coding tree 500 to enable appropriate decoding of the frame P(3,2).

One of the routes that the controller 208 may select is re-routing A 502 and another route is re-routing B 504. In re-routing A 502, the controller 208 needs to send frames I(2,2) and P(3,2), since frame I(2,2) is an intra coded frame and thus does not require a reference frame. In re-routing B 504, the controller 208 is required to send frames P(1,2), $P_2(2,1)$, and P(3,2) because frame I(0,0) was previously sent to the client 220. In this example, there are thus two root nodes, frame I(0,0) and frame I(2,2). The controller 208 is configured to determine the transmission costs associated with each of the re-routing paths 502 and 504 and to select the re-routing path that requires the minimum transmission cost. In this example, the re-routing A 502 may not necessarily require the least transmission cost because an I-frame I(0,0) is communicated in place of multiple P-frames.

Examples of methods in which the system 200 may be employed to manage video data composed of a plurality of frames will now be described with respect to the following flow diagrams of the methods 600 and 700 respectively depicted in FIGS. 6 and 7. It should be apparent to those of ordinary skill in the art that other steps may be added or existing steps may be removed, modified or rearranged without departing from the scopes of the methods 600 and 700.

The descriptions of the methods 600 and 700 are made with reference to the system 200 illustrated in FIG. 2, and thus makes reference to the elements cited therein. It should, however, be understood that the methods 600 and 700 are not limited to the elements set forth in the system 200. Instead, it should be understood that the methods 600 and 700 may be practiced by a system having a different configuration than that set forth in the system 200.

Some or all of the operations set forth in the methods 600 and 700 may be contained as utilities, programs, or subprograms, in any desired computer accessible medium. In addition, the methods 600 and 700 may be embodied by computer programs, which may exist in a variety of forms both active and inactive. For example, they may exist as software program(s) comprised of program instructions in source code, object code, executable code or other formats. Any of the above may be embodied on a computer readable medium.

Exemplary computer readable storage devices include conventional computer system RAM, ROM, EPROM, EEPROM, and magnetic or optical disks or tapes. Concrete examples of the foregoing include distribution of the programs on a CD ROM or via Internet download. It is therefore to be understood that any electronic device capable of executing the above-described functions may perform those functions enumerated above.

Figure 6:
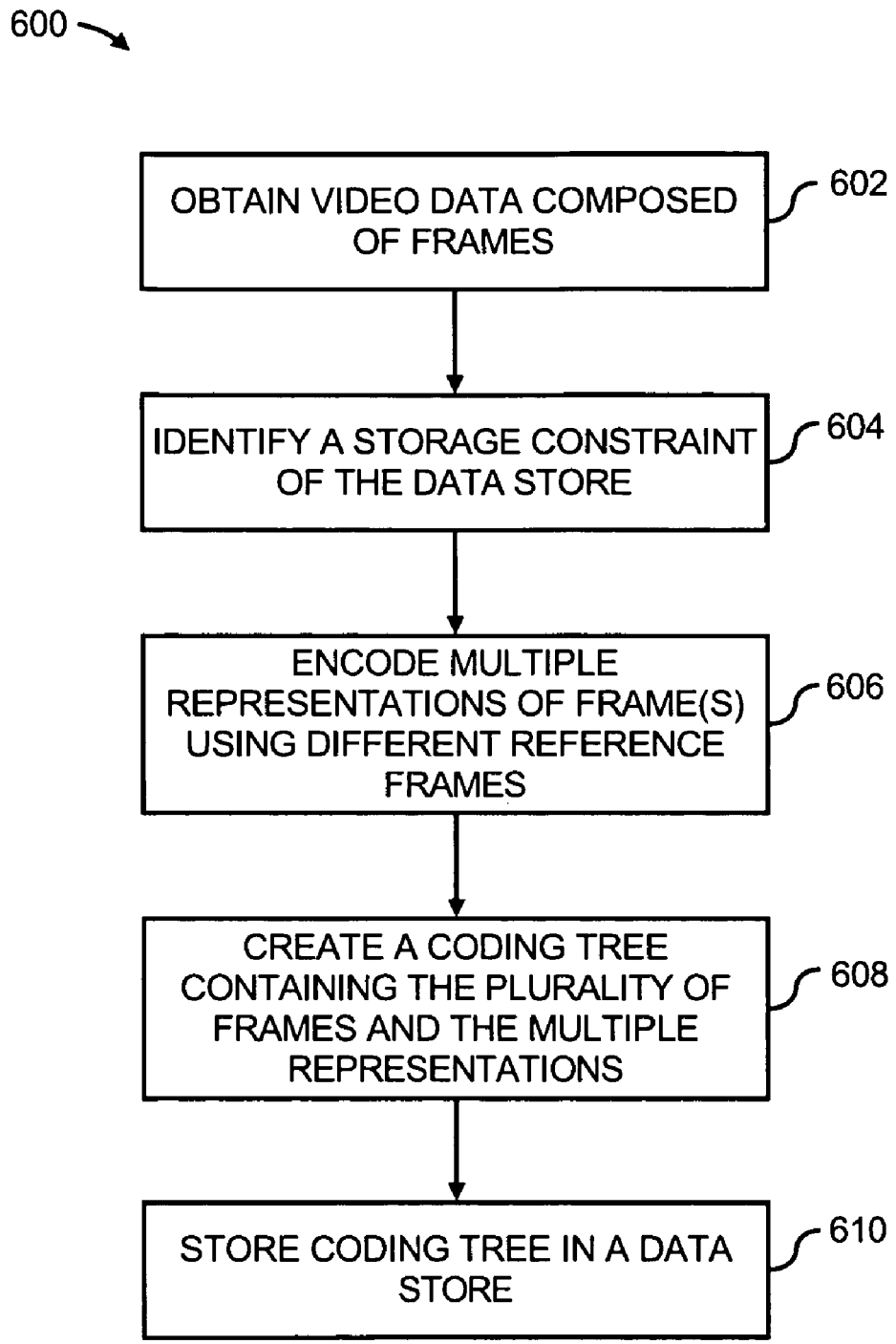
FIGS. 6 and 7, respectively show a flow diagram of a method of managing multiview streaming video data composed of a plurality of frames, according to an embodiment of the invention.

With reference first to FIG. 6, there is shown a flow diagram of a method 600 of managing multiview streaming video data composed of a plurality of frames, according to an example. As discussed above, the video data may be managed to optimize a tradeoff between costs associated with transmitting the encoded frames of the video data and costs associated with storing the encoded frames along with predicted sequences of the frames. In one regard, the frames are encoded to enable relatively efficient interactive control over content received by a client 220, such as, multiple views of a common scene.

At step 602, multiview streaming video data composed of a plurality of frames is obtained from, for instance, the data store 210 or other sources, such as, video cameras positioned at multiple locations and configured capture a common scene. At step 604, the controller 208 identifies a storage constraint of the data store 210. The storage constraint of the data store 210 may comprise a physical storage constraint, such as, the maximum storage capacity of the data store 210. In addition, or alternatively, the storage constraint may comprise an imposed limit set for storage of the encoded frames in the data store 210.

At step 606, the encoder 204 encodes multiple representations of at least one frame of the plurality of frames using different reference frames for each of the multiple representations, wherein the multiple representations correspond to a common time index and a common view. In addition, at step 608, the controller 208 creates a coding tree containing the plurality of frames and the multiple representations in light of the storage constraint of the data store 210, for instance, as shown in FIGS. 4 and 5. More particularly, the controller 208 creates the coding tree with at least one of the multiple representations omitted from the coding tree such that the coding tree requires less space than the storage constraint.

According to an example, in determining which of the multiple representations to omit from the coding tree, the controller 208 is configured to implement an interaction model that describes a probability of a client 220 requesting a particular frame having a time instant (i+1) and view (k) after viewing a frame having a time instant (i) and a view (j). The interaction model may determine the probability, for instance, based upon historical information pertaining to which frames have been selected following receipt of other reference frames. In addition, the controller 208 is configured to arrange the plurality of frames in the coding tree based upon the interaction model, such that, those frames that have the least likelihood of being requested are omitted from the coding tree first to remain with the storage constraint of the data store.

In creating the coding tree at step 608, the controller 208 may be further configured to calculate transmission costs associated with communicating the multiple representations of the at least one frame to a client 220. In addition, the controller 208 may be configured to determine which of the P-frames, if any, to replace with I-frames to reduce the storage costs and to determine a combination of the P-frames and the I-frames that substantially minimizes the calculated transmission costs while remaining within the storage constraint of the data store 210.

At step 610, the controller 208 stores the coding tree in the data store 210.

Although the controller 208 has been described as creating the coding tree to omit particular frames from the coding tree, it should be understood that the controller 208 may remove the multiple representation(s) after being included in the coding tree in order to remain within the storage constraint of the data store 210.

Through implementation of the method 600, the controller 208 is configured to generate a coding tree similar to those depicted in FIGS. 4 and 5. Thus, the controller 208 is configured to create a coding tree in which at least one of the multiple representations of the at least one frame corresponds to each view in each time index. The coding tree created by the controller 208 may also enable more than one route through the coding tree to be available, to thus enable the client 220 to receive and appropriately decode selected frames from the coding tree. An example of a manner in which the route through the coding tree may be selected to substantially minimize transmission costs is described with respect to FIG. 7.

Figure 7:
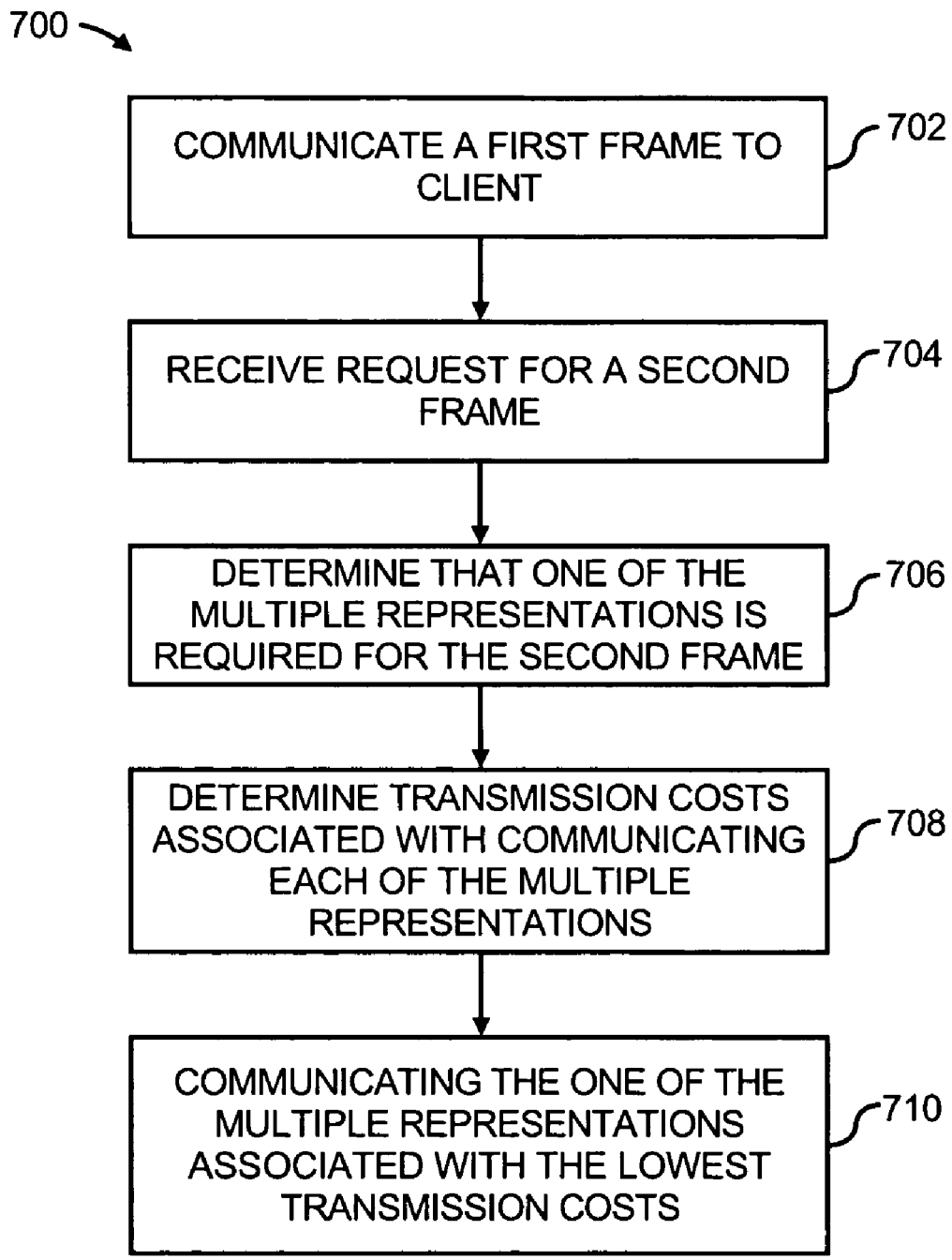

FIG. 7, more particularly, shows a flow diagram of a method 700 of managing video data composed of a plurality of frames in furtherance to the method 600, according to an example. FIG. 7, more particularly, depicts steps for implementing the coding tree generated through the method 600 to substantially minimize transmission costs. In effect, the method 700 is similar to the re-routing of frames and paths discussed above.

At step 702, the controller 208 communicates a first frame to a client 220. At step 704, the controller 208 receives a request for a second frame from the client 220. At step 706, the controller 208 determines that one of the multiple representations of the at least one frame is required for the second frame to be appropriately decoded at the client 220. At step 708, the controller 208 determines transmission costs associated with communicating each of the multiple representations. In addition, at step 710, the controller 208 communicates the one of the multiple representations of the at least one frame associated with a lowest transmission cost to the client 220.

An example of a manner in which the controller 208 may create the coding trees will now be described. Generally speaking, the encoder 204 is configured to encode individual frames of a multiview video and to store the encoded individual frames in the data store 210. The number of captured views at a given frame capturing instant is a constant K. In other words, K different views of a scene are simultaneously captured periodically. As discussed above, the different views of a given frame may be captured by multiple cameras or from multiple frames from frame buffers, for instance, from a virtual world representation.

With reference back to the redundant coding structure 400, it is assumed that the first frame-capturing instance of time index 0, denoted by I-frame I(0,0), is of a single view [K/2], and there are N frame-capturing instances in total. The coding structure 400 is considered to be redundant because it contains multiple representations of the same frames, with each of the multiple representations having different reference frames.

FIG. 4 depicts two different views (K=2) and four frame-capturing instances (N=4). In addition, there is one basic dependency tree with a root at I(0,0). The redundant coding structure 400 illustrates that most of the frames are encoded into multiple representations as an I-frame and/or P-frame(s), each using a different reference frame. Thus, when a client 220 requests a view K for a next time index i+1 after viewing a particular representation of a frame $F_{i,j}$ of the time index i and view j, the controller 208 selects either an I-frame $I_{i+1}$,k if available, a P-frame $P_{i+1}$,k motion compensated using $F_{i,j}$, if available or an alternative P-frame $P_{i+1}$,k motion-compensated using a different reference frame F≠$F_{i,j}$. In the last alternative, reference frame(s) including F must also be sent to the client 220 for correct decoding of $P_{i+1}$,k.

An original frame $F_{i,j}^0$ of time index I and view j may be encoded into numerous representations $F_{i,j}$ and at least one representation as an I-frame $I_{i,j}$ or a P-frame $P_{i,j}$(F) motion-compensated using different references F's. For simplicity, a P-frame $P_{i,j}$(F) is only assumed to be motion-compensated using as reference an encoded frame F of time index i−1 and of view between max(1,j−1) and min(K,j+1).

All of the encoded frames of a particular representation may be organized into a set of S basic dependency trees $\tau = \{T^1, \ldots, T^S\}$ of different root frames. A tree $T^S(I_{i,j}^s)$, with a unique root I-frame $I_{i,j}^s$, is recursively define as follows:

$$T(F) = F \cup \{T(F') | F \leftarrow F'\} \quad \text{Equation (1)}$$

Equation (1) indicates that a tree T(F) rooted at a frame F is a frame set composed of frame F and (sub-)trees stemming from frame F. A basic dependency tree is a tree with a root frame encoded as an I-frame. Using tree set τ, a dependency path of a frame F, p(F), as the ordered set of all frames that proceed from the root I-frame to frame F in the basic dependency tree to which F belongs. More particularly, the dependency path $p(F)=\{F_1^p, \ldots, F_{|p|}^p=F\}$ is a series of motion-compensated frames, where inside path p frame $F_i^p$ is motion compensated using $F_{i-1}^p$ for $i \geq 2$ and $F_1^p$ is an I-frame.

For practical purposes, it is assumed that each original frame $F_{i,j}^0$ cannot be encoded in more than M representations. As such, the maximum number of nodes in a set of basic dependency trees is bounded by M N K. Otherwise, a set of basic dependency trees may have an exponentially large number of nodes as a function of the original frames N K.

The feasible space for the representation of the multiview video (Θ) may be defined as the set of basic dependency trees τ, as described in Equation (1), such that each original frame $F_{i,j}^0$ is encoded no more than M times but at least once, either as an I-frame or as a P-frame using an encoded $F_{i-1,K}$, for $\max(1, j-1) \leq k \leq \min(K, j+1)$. Each chosen tree set (τ∈Θ) implies both a storage and transmission cost.

An example of a manner in which the storage costs of a coding tree 400 stored in a data store 210 may be calculated will now be discussed. For I-frames, let $|I_{i,j}|$ denote the byte count of encoding original frame $F_{i,j}^0$ as I-frame $|I_{i,j}| = \infty$ denotes the case when $F_{i,j}^0$ was not encoded as an I-frame. Similarly, for P-frames, let $|P_{i,j}(F)|$ denote the byte count required to encode $F_{i,j}^0$ as a P-frame using frame F for motion compensation. $|P_{i,j}(F)| = \infty$ will denote the case when $F_{i,j}^0$ was not encoded as a P-frame using F for motion compensation. The storage cost of the representation τ, B(τ) may be written as:

$$B(\tau) = \sum_{T^S \in \tau} b(I_{i,j}^s) \quad \text{Equation (2)}$$

$$b(F) = |F| + \sum_{F' | F \leftarrow F'} b(F').$$

In other words, the storage cost of a coding tree τ(F) rooted at F is the size of the root frame |F| plus trees stemming from F.

An example of a manner in which frame-to-frame transmission costs may be calculated will now be discussed. Assume that after viewing an encoded frame $F_{i,j}$ with dependency path $p = p(F_{i,j})$, the user chooses for viewing a frame at time i+1 of view k. The controller 208 makes a deterministic decision on which encoded representation of the frame $F_{i+1,k}^0$ to send to the client 220 based on $F_{i,j}$ and k as follows: First, if either encoded I-frame $I_{i+1,k}$ or P-frame $P_{i+1,k}(F_{i,j})$ is available, the controller 208 may send either to the client 220 for decoding and display.

If neither of these frames is available, the controller 208 finds an alternative P-frame $P_{i+1,k}(F')$, $F' \neq F_{i,j}$, for instance, a P-frame whose reference frame is not available at the client 220, with an alternative path q=p(F'), where either: i) paths p and q are non-overlapping paths; or ii) paths p and q overlap and first diverge after frame $F_d^q$ of path q. "Non-overlapping" here is intended to mean that motion-compensated $F_{i,j}$ and F share no common decoding history, and "overlapping" is intended to mean that $F_{i,j}$ and F share, and decoding history up until $F_d^q$. In the first case, the controller 208 needs to send all of the frames in the dependency path $q = \{F_1^q, \ldots, F_{|q|}^q = F'\}$ and the P-frame $P_{i+1,k}(F')$ itself for correct decoding of the frame with the time index i+1 and view k, in which case, the decoder 224 will display only the decoded P-frame $P_{i+1,k}(F')$. In the second case, the controller 208 needs to send sub-path $\{F_{d+1}^q, \ldots, F_{|q|}^q = F'\}$ of path q and the P-frame $P_{i+1,k}(F')$. Thus, the total transmission cost of re-routing the dependency path from p to q, r(p,q), for each of these two cases is as follows:

$$r(p,q) = \begin{cases} |F_{d+1}^q| + \ldots + |F_{|q|}^q| & \text{if } p, q \text{ overlap} \\ & \text{till } F_d^q \\ |F_1^q| + \ldots + |F_{|q|}^q| & \text{otherwise} \end{cases} \quad \text{Equation (3)}$$

There may be multiple alternative P-frames $P_{i+1,k}(F')$ for different references F''s and alternative paths p(F')'s. Thus, the controller 208 needs to find one with the lowest transmission cost φ(p,k) given dependency path $p(F_{i,j})$ and desired view k as follows:

$$\phi(p(F_{i,j}), k) = \min_{F'} \{|P_{i+1,k}(F')| + r(p(F_{i,j}), p(F'))\}. \quad \text{Equation (4)}$$

The transmission cost for the user to choose view k after observing encoded frame $F_{i,j}$, $\Phi(F_{i,j}, k)$, is then the minimum transmission cost of the possibly available I-frame, P-frame, and alternative P-frame(s):

$$\Phi(F_{i,j}, k) = \min\{|I_{i+1,k}|, |P_{i+1,k}(F_{i,j})|, \phi(p(F_{i,j}), k)\}. \quad \text{Equation (5)}$$

An example of a manner in which the optimization of the storage costs and the transmission costs may be determined will now be discussed. Let C(τ) denote the expected transmission cost of an N-frame interactive multiview streaming given a tree set τ. After observing an encoded representation of original frame $F_{i,j}^0$, assume that the user watches the next view k at the next time index i+1 with a probability $\alpha_{i,j}(k)$, where $\Sigma_k \alpha_{i,j}(k) = 1$. Using a derivation of frame-to-frame transmission cost from equation (5), the expected transmission cost C(τ) may be written as:

$$C(\tau) = \left|F_{0,\lceil \frac{K}{2} \rceil}\right| + c\left(F_{0,\lceil \frac{K}{2} \rceil}\right) \quad \text{Equation (6)}$$

$$c = (F_{i,j}) = \sum_{k=\max(1,j-1)}^{\min(K,j+1)} \alpha_{i,j}(k) \left[ \begin{array}{c} \Phi(F_{i,j}, k) + \\ c(\psi(F_{i,j}, k)) \end{array} \right].$$

Equation (6) may efficiently be calculated in a recursive manner. First, $c(F_{i,j})$ is a sum of at most three terms. Second, $\phi(p(F_{i,j}), k)$ in $\Phi(F_{i,j}, k)$ has at most M references F''s (maximum M representations of $F_{i+1,k}$) to test. For each reference F', rerouting cost $r(p(F_{i,j}), p(F'))$ has at most N additions. A first time computed $c(F_{i,j})$ is stored in a table so that a future recursive call to $c(F_{i,j})$ may simply return the calculated value. The computation complexity of equation (6) is therefore M*N times the maximum number of nodes in tree set τ, or $O(M^2 N^2 K)$.

The calculation of the storage cost may be simplified by instead of finding exact encoding costs of P-frames for all possible encoded representations of an original frame, assuming that $I_{i,j} = r_{i,j}^I$ and that $P_{i,j}(F_{i-1,k}) = r_{i,j}^P(k)$ for any encoded representation $F_{i-1,k}$ of an original frame $F_{i-1,k}^0$. The interactive multiview streaming optimization, denoted as IMVS, may now be formalized as follows. Given transition probabilities $\alpha_{i,j}(k)$'s and encoding rates $r_{i,j}^I$'s and $r_{i,j}^P(k)$'s for N frames of multiview video of K views, find the optimal tree set $\tau$ in a feasible space $\Theta$ that minimizes expected transmission cost $C(\tau)$ subject to a storage constraint $\overline{B}$, which may be written mathematically as:

$$\min_{\tau \in \Theta} C(\tau) \text{ s.t. } B(\tau) \leq \overline{B}. \quad \text{Equation (7)}$$

An example of a manner in which approximation algorithms may be employed to optimize the IMVS will now be discussed. As an initial solution $\tau^I$, a minimum storage solution, one that requires a minimum storage space for all frames of all views, where each frame of each view is encoded only once is found. Assuming that the size of an I-frame $|I_{i,j}|$ is larger than its P-frame counterpart $|P_{i,j}(F_{i-1,k})|$, the minimum storage solution $\tau^I$ is the I-frame followed by all of the P-frames. The minimum storage solution $\tau^I$ may be found mathematically as:

$$B_{min}(\tau) = I_{0,\lceil \frac{K}{2} \rceil} + b_{min}(1) \quad \text{Equation (8)}$$

$$b_{min}(i) = \sum_{j=1}^{K} \min_{k=max(1,j-1)}^{min(K,j+1)} r_{i,j}^P(k) + U(i < N-1)b_{min}(i+1).$$

In equation (8), U(c)=1 if clause c is true and 0 otherwise. In addition, equation (8) basically finds the smallest P-frame $P_{i,j}(F_{i-1,k})$ for each original frame $F_{i,j}^0$.

The next step is to find a locally optimal solution from $\tau^I$. This may be done iteratively by defining a series of augmentations and selecting among those the one that provides the greater decrease in a chosen cost function. Examples of suitable augmentations include, changing a P-frame $P_{i,j}(F_{i-1,k})$ to an I-frame $I_{i,j}$, selecting a different reference frame F' for a P-frame $P_{i,j}(F_{i-1,k})$, adding a new I-frame $I_{i,j}$, and adding a new P-frame $P_{i,j}(F_{i-1,k})$. The first two augmentations do not increase the number of representations of a given frame, while each of the next two augmentations increases the number of representations by one. As such, the last two augmentations may be implemented when the number of representations of that frame is less than M. The resulting solution will always have at least one representation of each frame of each view.

When a new I-frame $I_{i,j}$ Is added to "complement" existing P-frame(s), a determination of which children of the existing P-frame(s) should switch parents to the newly added I-frame. This may be done greedily, that is, a child of an existing P-frame is switched if by switching, the transmission cost goes down. Similarly, optimum parent and child node selections are also performed greedily when adding a new P-frame.

Given the augmentations discussed above, two algorithms with two calls functions are proposed. The first proposal is a Lagrangian cost:

$$J(\tau) = C(\tau) + \lambda B(\tau). \quad \text{Equation (9)}$$

In equation (9), $\lambda \geq 0$ is the Lagrangian multiplier. At each iteration, the augmentation providing the greatest decrease in Lagrangian cost is selected. In addition, the algorithm is stopped when no further cost reductions are possible given $\lambda$. Moreover, tradeoffs between storage and transmission costs may be varied through use of different $\lambda$'s.

Alternatively, at each iteration the augmentation of all of the frames $F_{i,j}$'s in a current solution $\tau$ may be selected such that the ratio of the decrease in transmission cost $\Delta C(\tau)$ to increase in storage cost $\Delta B(\tau)$ Is the largest. This algorithm may stop when the next such beneficial augmentation will exceed a storage constraint $\overline{B}$.

Figure 8:
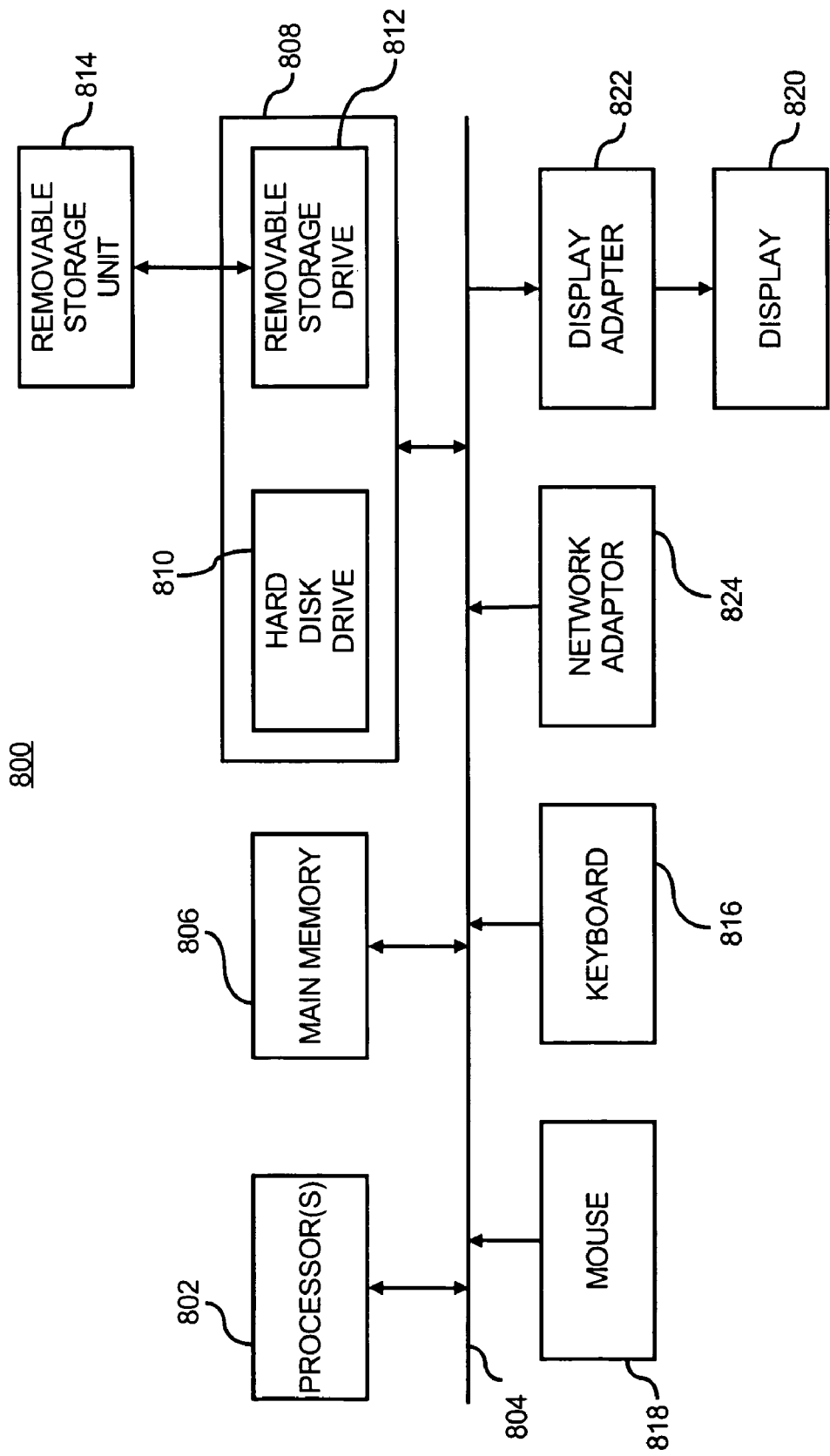
FIG. 8 shows a block diagram of a computing apparatus configured to implement or execute the methods depicted in FIGS. 6 and 7, according to an embodiment of the invention.

FIG. 8 illustrates a block diagram of a computing apparatus 800 configured to implement or execute the methods 600 and 700 depicted in FIGS. 6 and 7, according to an example. In this respect, the computing apparatus 800 may be used as a platform for executing one or more of the functions described hereinabove with respect to the server 202 depicted in FIG. 1.

The computing apparatus 800 includes a processor 802 that may implement or execute some or all of the steps described in the methods 600 and 700. Commands and data from the processor 802 are communicated over a communication bus 804. The computing apparatus 800 also includes a main memory 806, such as a random access memory (RAM), where the program code for the processor 802, may be executed during runtime, and a secondary memory 808. The secondary memory 808 includes, for example, one or more hard disk drives 810 and/or a removable storage drive 812, representing a floppy diskette drive, a magnetic tape drive, a compact disk drive, etc., where a copy of the program code for the methods 600 and 700 may be stored.

The removable storage drive 812 reads from and/or writes to a removable storage unit 814 in a well-known manner. User input and output devices may include a keyboard 816, a mouse 818, and a display 820. A display adaptor 822 may interface with the communication bus 804 and the display 820 and may receive display data from the processor 802 and convert the display data into display commands for the display 820. In addition, the processor(s) 802 may communicate over a network, for instance, the Internet, LAN, etc., through a network adaptor 824.

It will be apparent to one of ordinary skill in the art that other known electronic components may be added or substituted in the computing apparatus 800. It should also be apparent that one or more of the components depicted in FIG. 8 may be optional (for instance, user input devices, secondary memory, etc.).

What has been described and illustrated herein is a preferred embodiment of the invention along with some of its variations. The terms, descriptions and figures used herein are set forth by way of illustration only and are not meant as limitations. Those skilled in the art will recognize that many variations are possible within the scope of the invention, which is intended to be defined by the following claims—and their equivalents—in which all terms are meant in their broadest reasonable sense unless otherwise indicated.

What is claimed is:

1. A system for managing multiview streaming video data composed of a plurality of frames, said system comprising:
   an encoder configured to encode multiple representations of at least one frame of the plurality of frames corresponding to multiple views using different reference frames for each of the multiple representations, wherein the multiple representations of the at least one frame correspond to a common time instant and a common view;
   a controller, comprising a processor, configured to create a coding tree containing the plurality of frames and the multiple representations, wherein the coding tree is composed of a root I-frame and a plurality of P-frames and depicts frame paths for each of the encoded plurality of frames that identify which of the frames comprise reference frames for other frames, and wherein the controller is further configured to maintain at least one of the multiple representations as one of a P-frame and an I-frame that corresponds to each view in each time instant;

a data store configured to store the coding tree, wherein the controller is further configured to identify a storage constraint of the data store and to omit at least one of the multiple representations from the coding tree to cause the plurality of frames stored in the data store to remain within the storage constraint.

2. The system according to claim 1, wherein the controller is further configured to implement an interaction model that describes a probability of a client requesting a particular frame having a time instant (i+1) and view (k) after viewing a frame having a time instant (i) and a view (j) and to arrange the plurality of frames based upon the interaction model, such that, those frames that have the least likelihood of being requested are omitted from the coding tree first to remain with the storage constraint of the data store.

3. The system according to claim 1, wherein the controller is further configured to calculate transmission costs associated with communicating the multiple representations to a client, wherein the multiple representations of the plurality of frames comprise P-frames, and wherein the controller is further configured to replace the P-frames of the multiple representations of the at least one frame with an I-frame and to store the I-frame as a node of the at least one frame in the coding tree to thereby minimize the calculated transmission costs while remaining within the storage constraint of the data store.

4. The system according to claim 1, wherein the controller is further configured to communicate a first frame to a client, to receive a request for a second frame from the client, to determine that one of the multiple representations of the at least one frame is required for the second frame to be appropriately decoded at the client, to determine transmission costs associated with communicating each of the multiple representations of the at least one frame along multiple paths through the coding tree for appropriately decoding the second frame at the client, and to communicate the one of the multiple representations of the at least one frame associated with a lowest transmission cost to the client.

5. A method of managing multiview streaming video data composed of a plurality of frames, said method comprising:
  identifying a storage constraint of a data store configured to store the multiview streaming video;
  encoding multiple representations of at least one frame of the plurality of frames corresponding to multiple views using different reference frames for each of the multiple representations, wherein the multiple representations correspond to a common time instant and a common view;
  creating, by a processor, a coding tree containing the plurality of frames and the multiple representations in light of the storage constraint of the data store by omitting at least one of the multiple representations, wherein the coding tree is composed of a root I-frame and a plurality of P-frames and depicts frame paths for each of the encoded plurality of frames that identify which of the frames comprise reference frames for other frames, and wherein the coding tree maintains at least one of the multiple representations as one of a P-frame and an I-frame that corresponds to each view in each time instant; and
  storing the coding tree in a data store.

6. The method according to claim 5, further comprising:
  implementing an interaction model that describes a probability of a client requesting a particular frame having a time instant (i+1) and view (k) after viewing a frame having a time instant (i) and a view (j); and
  wherein creating the coding tree further comprises arranging the plurality of frames based upon the interaction model, such that, those frames that have the least likelihood of being requested are omitted from the coding tree first to remain with the storage constraint of the data store.

7. The method according to claim 5, wherein the multiple representations of the plurality of frames comprise P-frames, said method further comprising:
  calculating transmission costs associated with communicating the multiple representations to a client;
  replacing the P-frames of the multiple representations of the at least one frame with an I-frame; and
  storing the I-frame as a node of the at least one frame in a coding tree to thereby minimize the calculated transmission costs while remaining within the storage constraint of the data store.

8. The method according to claim 5, further comprising:
  communicating a first frame to a client;
  receiving a request for a second frame from the client;
  determining that one of the multiple representations of the at least one frame is required for the second frame to be appropriately decoded at the client;
  determining transmission costs associated with communicating each of the multiple representations along multiple paths through the coding tree for appropriately decoding the second frame at the client; and
  communicating the one of the multiple representations associated with a lowest transmission cost to the client.

9. A non-transitory computer readable storage medium on which is embedded one or more computer programs, said one or more computer programs implementing a method of managing multiview streaming video data composed of a plurality of frames, said one or more computer programs comprising computer readable code for:
  identifying a storage constraint of the data store configured to store the multiview streaming video;
  encoding multiple representations of at least one frame of the plurality of frames corresponding to multiple views using different reference frames for each of the multiple versions, wherein the multiple representations correspond to a common time instant and a common view;
  creating a coding tree containing the plurality of frames and the multiple representations in light of the storage constraint of the data store by omitting at least one of the multiple representations, wherein the coding tree is composed of a root I-frame and a plurality of P-frames and depicts frame paths for each of the encoded plurality of frames that identify which of the frames comprise reference frames for other frames, and wherein the coding tree maintains at least one of the multiple representations as one of a P-frame and an I-frame that corresponds to each view in each time instant; and
  storing the coding tree in a data store.

10. The computer readable storage medium according to claim 9, said one or more computer programs further comprising computer readable code for:
  implementing an interaction model that describes a probability of a client requesting a particular frame having a time instant (i+1) and view (k) after viewing a frame having a time instant (i) and a view (j); and wherein creating the coding tree further comprises arranging the plurality of frames based upon the interaction model, such that, those frames that have the least likelihood of being requested are omitted from the coding tree first to remain with the storage constraint of the data store.

11. The computer readable storage medium according to claim 9, said one or more computer programs further comprising computer readable code for:

calculating transmission costs associated with communicating the multiple representations to a client;

replacing the P-frames of the multiple representations of the at least one frame with an I-frame; and storing the I-frame as a node of the at least one frame in a coding tree to thereby minimize the calculated transmission costs while remaining within the storage constraint of the data store.

12. The computer readable storage medium according to claim 9, said one or more computer programs further comprising computer readable code for:

communicating a first frame to a client;

receiving a request for a second frame from the client;

determining that one of the multiple representations of the at least one frame is required for the second frame to be appropriately decoded at the client;

determining transmission costs associated with communicating each of the multiple representations along multiple paths through the coding tree for appropriately decoding the second frame at the client; and communicating the one of the multiple representations associated with a lowest transmission cost to the client.

* * * * *